May 11, 1965 C. HOFFROGGE 3,182,375
APPARATUS FOR COMPENSATION OF THE ERROR OF A GUIDE
ON MEASURING DEVICES AND TOOL MACHINES
Filed Dec. 12, 1961 3 Sheets-Sheet 1

INVENTOR
CHRISTIAN HOFFROGGE
BY
ATTORNEY.

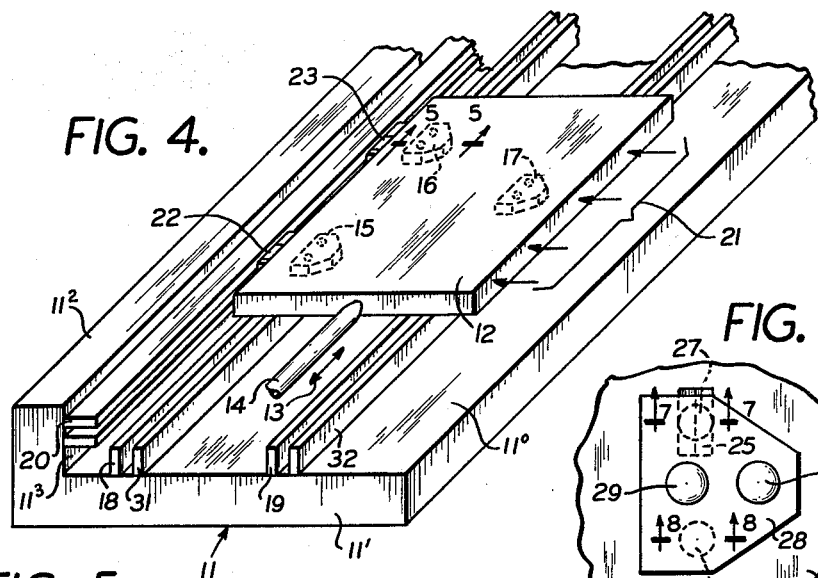
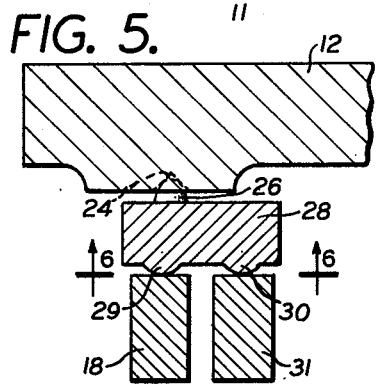
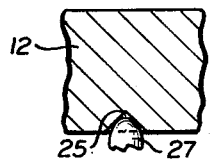
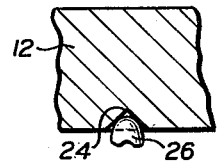
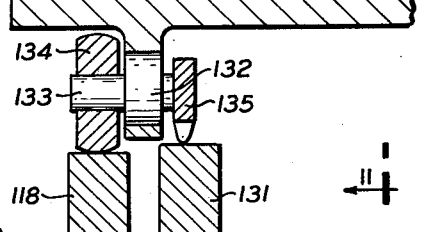
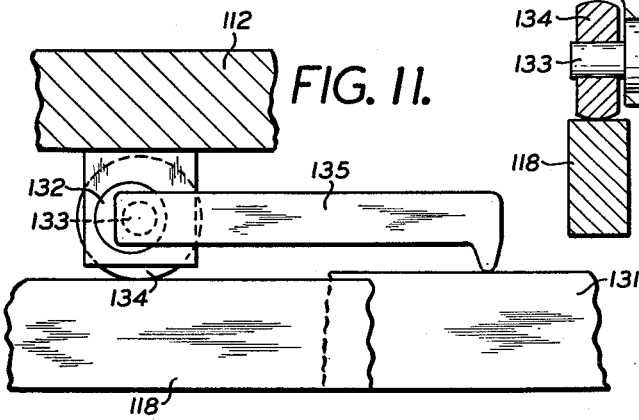
INVENTOR
CHRISTIAN HOFFROGGE
BY
ATTORNEY.

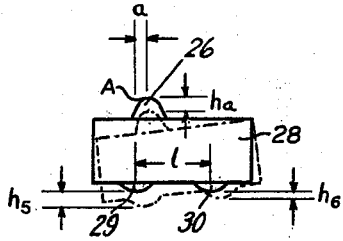
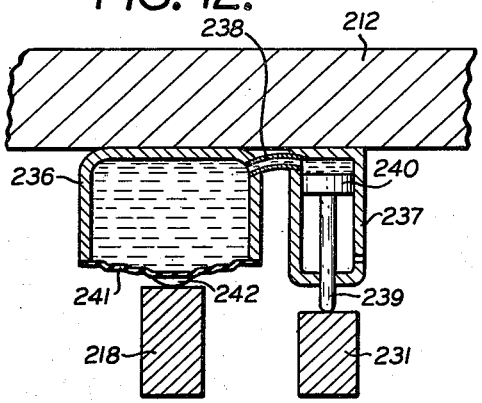
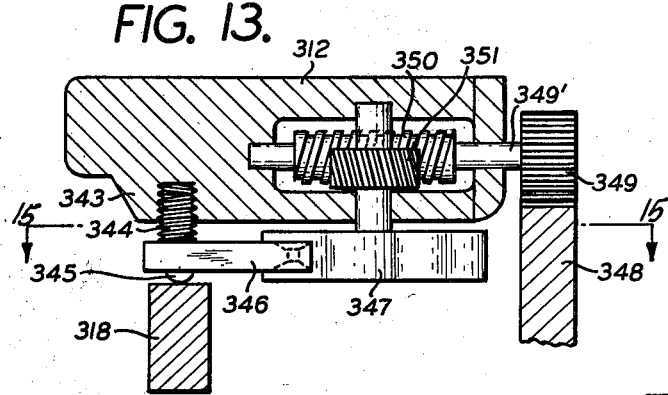
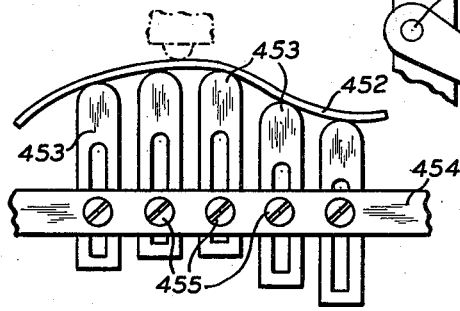
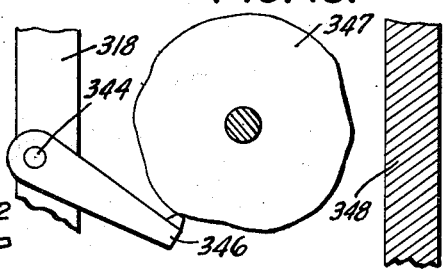
INVENTOR
CHRISTIAN HOFFROGGE United States Patent Office 3,182,375
Patented May 11, 1965

3,182,375
APPARATUS FOR COMPENSATION OF THE ERROR OF A GUIDE ON MEASURING DEVICES AND TOOL MACHINES
Christian Hoffrogge, Braunschweig, Germany, assignor to Fa. Wenczler & Heidenhain, Traunreut, near Traunstein, Upper Bavaria, Germany, a corporation of Germany
Filed Dec. 12, 1961, Ser. No. 158,777
Claims priority, application Germany, Dec. 14, 1960, H 41,258
7 Claims. (Cl. 29—1)

The present invention relates to an apparatus for compensation of the errors of a guide on measuring devices and tool machines.

Arrangements are found on numerous measuring devices and tool machines, on which apparatus parts, slides, scanners or the like are slidably mounted. By these so-called guides a structural element is to be concerned with, the exactness of which reflects in many instances the exactness of the measuring operation or of the work piece. A guide is normally produced by a machine operation, by example by means of planing, milling or grinding. In case the requirements on exactness are high, it is necessary to provide a manually cumbersome operating finishing process, until all errors are reduced to the permissible tolerance. This finishing work, which can be performed only by specially skilled labor, increases the manufacturing costs of such measuring devices or tool machines.

It is, therefore, one object of the present invention to provide an apparatus for compensation of the errors of a guide on measuring devices and tool machines, according to which an object is guided over a base with the least possible error by effecting the object or part thereof to be guided in such manner that the known errors inherent in the guide path are automatically compensated for.

It is another object of the present invention to provide an apparatus for compensation of the errors of a guide on measuring devices and tool machines according to which the object to be guided is connected with structural elements, which are disposed between this object and the faces of the path, and which, on the one hand engage these faces, and, on the other hand, are supported by a second face or by a controllable abutment. The structural elements are of such nature that upon change of the second face or of the abutment the distance between the object and the path plane is changed. The errors of the individual path faces can be compensated for by a proper formation of the second face or by a control of the abutments, which must take place synchronously with the displacement of the object, so that the latter is guided practically free of errors.

With these and other objects in view, which will become apparent in the following detailed description, the present invention will be clearly understood in connection with the accompanying drawings, in which:

FIG. 4 is a top perspective view of a guide structure applying the principle disclosed in FIG. 1;

FIG. 5 is a fragmentary section along the lines 5—5 of FIG. 4;

FIG. 6 is a bottom plan view taken along the lines 6—6 of FIG. 5;

FIGS. 7 and 8 are fragmentary sections indicating the supporting members for the table;

FIG. 9 is a fragmentary elevation of the lever plate, as shown in FIG. 5;

FIG. 10 is a vertical section of the guide structure disclosing a second embodiment and applying the principle disclosed in FIG. 2;

FIG. 11 is an end view, partly in section, of the structure shown in FIG. 10;

FIG. 12 is a vertical section of the structure disclosing a third embodiment of the present invention and incorporating the principle disclosed in FIG. 3;

FIG. 13 is a vertical section of the structure disclosing a fourth embodiment of the present invention;

FIG. 14 is an elevation of the structure disclosing a fifth embodiment of the present invention; and FIG. 15 is a plan view of the structure disclosed in FIG. 13.

Figure 1:
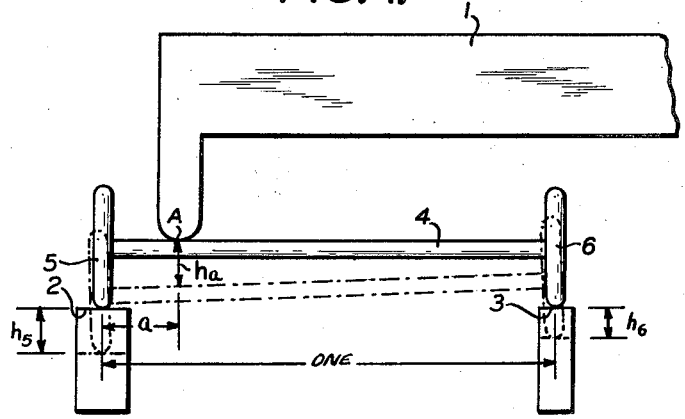
FIGURE 1 is a schematic elevation of one embodiment of the apparatus performing in accordance with the present invention.

Referring now to the drawings, and in particular to FIG. 1, the apparatus comprises a slide 1 which engages at the point A an axle 4 which carries at its ends wheels or slide blocks 5 and 6, which are mounted displaceably horizontally on a slide face 2 and on a slide face 3. The direction of movement is perpendicular to the face of the drawing. The relation between the height differences $h_5$ and $h_6$ of the two wheels 5 and 6 and height level changes $ha$ of the point A of the axle 4 is given as first approximation by the following equation:

(1) $$\frac{h_5(1-a)}{1}+\frac{h_6 \cdot a}{1}=ha$$

wherein

Unity is the distance between the wheels 5 and 6, and $a$ is the distance of the point A from the wheel 5.

With the changing values of $h_5$ and $h_6$ from place to place, the value of $ha$ is likewise forcibly changed. If the condition is set that the point A of the axle 4 is to remain at a certain constant predetermined level, that means $ha$ should equal zero, then the above-stated equation is transformed into the following form:

(2) $$h_5=\frac{-a}{1-a} \cdot h_6$$

The equation indicates that the height level changes of the two wheels 5 and 6 have opposite directions and must be proportional to the distance of the corresponding wheel from the point A.

Unity is required for the distance $$a=\frac{1}{2}$$

to make $h_5=-h_6$, that means, the faces 2 and 3 must be exactly mirror images of each other.

Now, for instance upon separating of one piece into two parts, in case it is done in suitable manner, two separating faces are created which are exact mirror images of each other. If two such separating faces are used as the faces 2 and 3, theoretically the center of the axle 4 remains permanently at the same level.

It is, however, first of all, not always possible, in case of very long guides, to produce two suitable separating faces, so that the face 3, for instance, has to be adjusted manually to the slide face 2. This arrangement would be at first equally cumbersome as the previously mentioned finishing work, if the circumstance could not be exploited, to dispose the point A, for instance, very close to the wheel 5, because the compensation change $-h_6$, which is then necessary for a change of $h_5$, is very large.

Furthermore, the load on the face 3 becomes correspondingly small, so that comparatively thin sheet metal can be used for this face 3. By this arrangement, the formation of the face 3 with the strongly raised mirror image of the previously measured face 2 becomes extremely simple. Here resides an important advantage over the method applied heretofore. A further advantage is found in an arrangement, according to which hardened guide faces can be used for a precision guide of great exactness, which hardened guide faces wear only very slightly during use.

Referring now again to the drawings, and in particular to FIGS. 4 to 9, an embodiment is disclosed which applies the principle set forth generally in FIG. 1.

A bed 11 is provided which is immovable and a table 12 is linearly movable relative to the bed 11 in the direction of the arrow 13. In order to bring about such movement of the table 12, a pin 14 engages the table 12, which pin 14 moves the table 12 against the force of a spring (not shown). The bed 11 is of substantially L cross-section and comprises a horizontal portion $11^1$ and a vertical portion $11^2$. The bed 11 is equipped with two guide rails 18 and 19 projecting from the top face $11^0$ of the portion $11^1$ of the bed 11, which guide rails 18 and 19 project upwardly and are spaced apart from each other. The table 12 rests by its own weight on the guide rails 18 and 19 by means of intermediate supporting members 15, 16 and 17. By such arrangement the table 12 is moved in vertical direction in a predetermined manner, though it is, of course, the aim of the entire guiding structure to prevent such vertical movements. The vertical portion $11^2$ of the bed 11 is likewise equipped with a guide rail 20 which projects forwardly from the front face $11^3$ of the vertical portion $11^2$ of the bed 11. The table 12 engages in horizontal direction the guide rail 20 and the table 12 is pushed against the guide rail 20 by means of springs (not shown) tending to move the table 12 in the direction of the arrows 21 (FIG. 4). It is the purpose of the guide 20, to prevent a lateral escape and any rotation of the table 12 about a vertical axis, and for this reason the table 12 is equipped with two lateral intermediate supporting members 22 and 23.

The engagement of the table 12 with the supporting members 22 and 23 is brought about in the same manner as obtained by means of any one of the respective supporting members 15, 16 and 17, and 23, and for the purpose of explanation of the operation, it will suffice to describe the conditions at one of such engagement points between the table 12 and one of the supporting members, in relation to the engaging guide rail.

Such engagement is set forth in greater detail in FIGS. 5 to 9.

As particularly clearly shown in FIGS. 6 to 8, the table 12 has at its bottom face two recesses 24 and 25 and rounded dome portions 26 and 27, respectively, of a lever plate 28 are received loosely in the recesses 24 and 25, the lever plate 28 being disposed between the bottom face of the table 12 and the supporting rails 18 and 19, respectively. The recess 24 is of a conical shape, while the recess 25 is formed longitudinally and of wedge-shape, as clearly shown in FIG. 6. In this manner it is assured that, upon engagement of both parts, the lever plate 28 can perform tilting movements only about an axis which is parallel to the direction of movement of the table 12, which direction is, however, clearly established. The lever plate 28 has at its underface two slide domes 29 and 30 (FIG. 5), which slide domes 29 and 30 engage the guide rail 18 and an additional rail, namely the correction rail 31 (FIG. 4). The dome 29 is slightly laterally set-off relative to the tilting axis of the lever plate 28, which tilting axis is defined by the connection line between the domes 26 and 27, as indicated in dotted lines in FIG. 6.

In FIG. 9 the lever plate 28 is shown having the dome 26, as well as the domes 29 and 30, as shown already in FIG. 5. FIG. 9 shows, however, the lever plate 28 in two different positions, the first position being shown in full lines, and the second position being shown in point-dotted lines. The values $a$, 1 and A correspond with the values indicated in FIG. 1 of the drawings. For the relation between the level changes $h_5$, $h_6$ and $ha$ of the respective engagement points of the lever plate 28, the equation set forth above under (1) applies here the same.

The value $h_5$ follows during the horizontal movement of the table 12 the "mountains" and "valleys" which are unavoidedly present on the guide rail 18. It is the purpose of the guide to maintain the value equal to zero over the entire length of the guide.

In order to achieve this end it is apparently merely required to chose the value $h_6$, the level variations of the correction rail 31, at each point of the total length of the guide at such a dimension, that the right side of the equation (1) set forth above equals zero. By this arrangement, the point A of FIG. 9, that is the dome 26 in FIG. 5 and, thereby, also the table 12, does not change its level position at the point 16. Since a similar effect is brought about also at the intermediate supporting members 15, 16, 17, 22 and 23, the table 12 moves during a displacement by means of the pin 14 in a completely straight line in the direction of the arrow 13.

Figure 2:
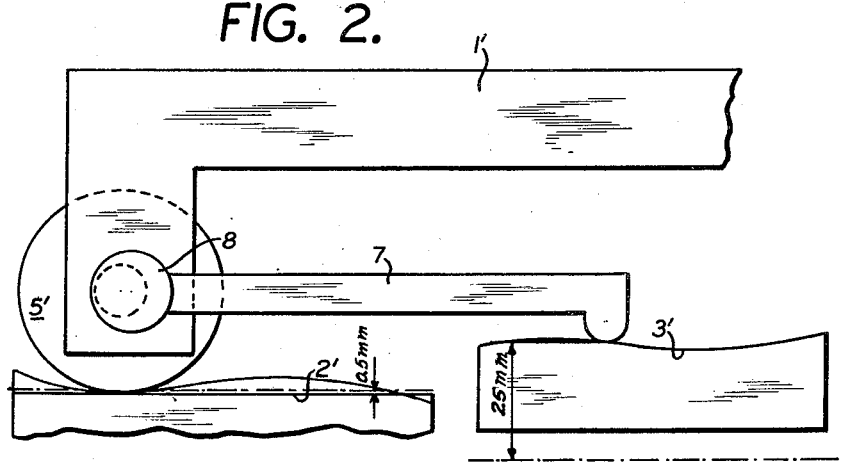
FIGS. 2 and 3 are schematic elevations of two additional embodiments of the present invention.

Referring now to FIG. 2, which discloses a second embodiment of the present invention, the operation of which is similar to the operation of the above-described first embodiment, it will be found that the apparatus comprises a slide 1' which is connected with an eccentric axle 8. A roller 5' journalled on the eccentric axle 8 runs on the face 2'. A lever arm 7 is connected with the eccentric axle 8, the free end of the lever arm 7 finding its support on the face 3'. The faces 2' and 3' are disposed adjacent each other, looking in the direction of the movement of the slide 1', which direction is parallel to the plane of the drawing.

Referring now again to the drawings, and in particular to FIGS. 10 and 11, in which an embodiment applying the principle shown in FIG. 2 is disclosed, a table 112 is provided which is supported by the guide rail 118, as well as by the correction rail 131. A disk 132 is mounted in a downwardly extending projection of the table 112, the disk 132 being journalled on an axle 133 which is disposed eccentrically in the disk 132. A roller 134 is rotatably mounted on the axle 133 and, on the other hand, a sensing lever 135 is likewise keyed to the axle 133. The "mountains" and "valleys" of the guide rail 118 are compensated in this example in such manner that correspondingly higher level changes of the correction rail 131 lower the axle 133 by means of the sensing lever 135 always only so much relative to the table 112 as the "valley" of the guide rail 118 amounts at this point, so that the table 112 is maintained always at the same level.

Figure 3:
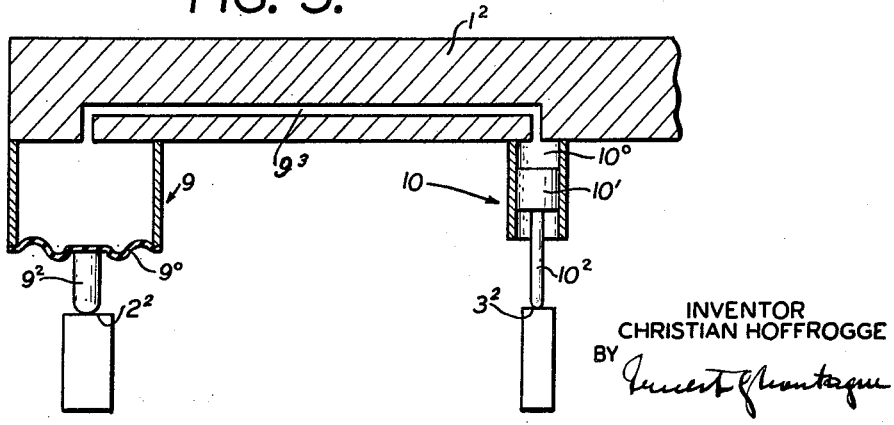

Referring now to FIG. 3, an embodiment is shown which is similar to that shown in FIG. 1, indicating again the slide $1^2$ resting on the faces $2^2$ and $3^2$. Instead of providing a lever as shown in FIG. 2 of the drawing, a hydraulic arrangement is provided consisting of the elements 9 and 10, the element 9 constituting a hydraulic cylinder having a diaphragm $9^0$ as its bottom and adapted to receive a hydraulic fluid while the element 10 is a hydraulic cylinder $10^0$ of smaller cross-section than that of the cylinder 9. A piston 10' reciprocates in the cylinder $10^0$. The diaphragm $9^0$ is equipped with a sensing pin $9^2$ for engagement with the face $2^2$ and the piston $10'$ is equipped with a sensing pin $10^2$ for engagement with the face $3^2$. A conduit $9^3$ provides communication between the cylinders 9 and $10^0$.

Referring now to FIG. 12 of the drawings, which follows the principle disclosed in FIG. 3, a table 212 is provided, the bottom face of which has secured thereto two hydraulic containers 236 and 237, which communicate with each other by means of a conduit 238. A piston 240 reciprocates in the container or cylinder 237, which piston 240 is equipped with a sensing pin 239, and depending upon the position of the piston 240 fluid will be pressed from the cylinder 237 into the cylinder 236 or the fluid will move in opposite direction upon lowering the piston 240 in the cylinder 237. The container or cylinder 236 is closed up at its bottom by means of a membrane 241, which is equipped at its outer face with a sensing dome 242.

The arrangement shown in FIG. 12 functions in such manner that a small level change of the sensing dome 242 corresponds to an appreciably larger level change of the sensing pin 239. In this manner it is possible here also to permit appreciably larger level changes to the correction rail 231, than to the actual guide rail 218.

Referring now to FIG. 13 of the drawings, a fourth embodiment of the present invention is disclosed herein which comprises a table 312 to be moved horizontally on suitable supports and which has at its underface a projection 343 carrying an inner thread, in which a threaded spindle 344 is inserted. The threaded spindle 344 terminates at its lower end in a sensing dome 345 which finds its support on the guide rail 318. A sensing lever 346 is connected non-rotatably with the threaded spindle 344, which sensing lever 346 is pressed towards a cam disk 347 by means of a spring (not shown). The cam disk 347 is rotated by means of a gear rack 348 which is connected with an immovable bed (not shown) similar to the bed shown in connection with the embodiment disclosed in FIG. 4, by arranging a pinion 349, the shaft 349' of which has keyed thereto a worm 350 meshing a worm gear 351, so that a predetermined rotary position of the cam disk 347 is coordinated to each of a plurality of positions of the table 312 disposed along the bed. The cam disk 347 is now designed in such manner in dependency upon the errors of the guide rail 318, that the sensing lever 346 receives always just such swinging movement, that the rotation of the threaded spindle 344 caused thereby corresponds with a lowering or rising of the sensing dome 345 relative to the table 312, so that it equals exactly the "mountain" or "valley" of the guide rail 318. In this manner the table 312 remains always at the same level position.

Referring now to FIG. 14 of the drawings, in which still a fifth embodiment of the present invention is disclosed, again a table (not shown) is to be supported during its longitudinal movement along a bed (not shown).

As a substitute for the correction rails 31, 131 and 231 of the above disclosed embodiments of the present invention, a steel band 452 is provided which is supported by individual supporting elements 453 which are adjustable as to their height relative to an immovable rail 454 and which may be secured to the latter by means of clamping screws 455. In this manner, the correction rail can be maintained in a predetermined shape concerning the level position at different points taken in longitudinal direction. This arrangement also permits easily an adjustment of the actual guide rails 18, 118 and 218, as shown in the above-stated embodiments due to wear on the guide rails.

FIG. 14 is merely a different embodiment of the actual supporting means for the bottom face of the table in substitution for the above-stated supporting means and the remaining elements are the same as the above-described embodiments and thus does not need further description thereof.

While I have disclosed several embodiments of the present invention, it is to be understood that these embodiments are given by example only and not in a limiting sense, the scope of the present invention being determined by the objects and the claims.

I claim:
1. An apparatus for guiding an object along a guide support, the surface of the latter having deviations from an intended straight line, comprising
   a first supporting member constituting a first guiding path and permitting movement of an object along its upper surface,
   a second supporting member constituting a second guiding path and disposed spaced apart from said first supporting member and having an upper surface,
   the upper surface of one of said supporting members being the mirror image of the other of said supporting members,
   an adding device sensing the upper surfaces of said first supporting member and of said second supporting member,
   said adding device adding deviations of said upper surfaces from imaginary lines,
   a member supporting the object to be guided,
   means for transmitting the sum obtained by said adding device to said member,
   the upper surface of said first supporting member and of said second supporting member being coordinated such that the individual points forming jointly said second guiding path are disposed at a distance from an imaginary relation face, which distance is proportional to the distance of the corresponding points on said first supporting member from said imaginary relation face,
   said distance of said corresponding points of said first and second guiding paths having a predetermined proportionality value, and
   said adding device being set corresponding to said predetermined porportionality factor, so that the sum arrived at by said adding device has the same value in all positions of the object to be guided.
2. The apparatus, as set forth in claim 1, wherein said transmitting means comprises a lug,
   a lever mounted at one end thereof and forming an eccentric held by said lug, and
   the other end of said lever engaging said upper surface of said second supporting member.
3. The apparatus, as set forth in claim 1, wherein
   said transmiting means comprises a lug, a lever eccentrically mounted at one end relative to said object, and
   the other end of said lever engaging said upper surface of said second supporting member.
4. The apparatus, as set forth in claim 1, wherein
   said drive means comprises two hydraulic containers communicating with each other and sensing means operatively connected with said containers, and said sensing means compensating said errors of unevenness by shifting fluid between said hydraulic containers,
   said sensing means of one of said containers engaging said upper surface of said supporting member and said sensing means of the other of said containers engaging said supporting surface of said second supporting member, and
   said upper surface of said first supporting member being a mirror complement of said upper surface of said second supporting member.
5. The apparatus, as set forth in claim 1, wherein
   one of said upper surfaces is raised relative to the other of said upper surfaces.
6. The apparatus, as set forth in claim 5, wherein
   said raised upper surface is formed by a steel band,
   a plurality of supporting elements maintaining said steel band in a predetermined position, and
   an immovable horizontally disposed rail secures adjust- ably said supporting elements in any of a plurality of positions at different levels.

7. The apparatus, as set forth in claim 5, which includes a cam disk having a cam face and rotatable in said object, a sensing lever engaging said cam face during rotation of said cam disk, said cam face constituting said raised upper surface, the rotating movement of said cam disk being synchronized with the movement of said object, and said sensing lever including means for lifting and lowering, respectively, the object to be guided in response to the position of said cam disk.

References Cited by the Examiner

UNITED STATES PATENTS

| | | | |
|---|---|---|---|
| 1,075,081 | 10/13 | Bager | 105—164 X |
| 1,075,178 | 10/13 | Wehner | 105—164 X |
| 1,128,151 | 2/15 | King et al. | 105—164 X |
| 2,021,537 | 11/35 | Bath et al. | 82—5 |
| 2,448,473 | 8/48 | Shrewsbury | 33—125 X |
| 2,612,697 | 10/52 | Mathsen | 33—125 |
| 2,851,890 | 7/53 | Jobert et al. | 29—64 X |

RICHARD H. EANES, Jr., Primary Examiner.

WHITMORE A. WILTZ, Examiner.